(12) United States Patent
Nichols et al.

(10) Patent No.: US 6,314,489 B1
(45) Date of Patent: Nov. 6, 2001

(54) METHODS AND SYSTEMS FOR STORING CELL DATA USING A BANK OF CELL BUFFERS

(75) Inventors: Stacy W. Nichols, Kanata; David A. Brown, Carp, both of (CA)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/113,296

(22) Filed: Jul. 10, 1998

(51) Int. Cl.[7] ................................. G06F 12/00
(52) U.S. Cl. .................... 711/1; 711/5; 711/104; 711/105; 711/108; 365/189.01; 365/189.02
(58) Field of Search .................... 711/108, 104–105, 711/1, 5; 365/189.02, 189.01

(56) References Cited

U.S. PATENT DOCUMENTS

| | | | |
|---|---|---|---|
| 3,787,817 | * 1/1974 | Goldberg | 711/104 |
| 4,562,532 | * 12/1985 | Nishizawa et al. | |
| 5,625,819 | * 4/1997 | Hoffer, Jr. | 707/202 |
| 5,706,482 | * 1/1998 | Matsushima et al. | 345/521 |

* cited by examiner

*Primary Examiner*—Do Hyun Yoo
*Assistant Examiner*—Mehdi Namazi
(74) *Attorney, Agent, or Firm*—Finnegan, Henderson, Farabow, Garrett & Dunner, L.L.P.

(57) ABSTRACT

Systems and methods consistent with the invention write and read data cells to and from a bank of cell buffer memories. The system includes a plurality of memory units for storing data cells. An address memory outputs a memory address and a memory selecting unit selects one of the plurality of memory units based on the outputted memory address. The system then performs a read or write operation at the outputted memory address of the selected memory unit. The system may write data cells to one memory unit while at the same time reading data cells from one of the other memory units.

35 Claims, 3 Drawing Sheets

METHODS AND SYSTEMS FOR STORING CELL DATA USING A BANK OF CELL BUFFERS

BACKGROUND OF THE INVENTION

A. Field of the Invention

The present invention relates to methods and systems for storing cell data, and, more particularly, to methods and systems for storing cell data using a bank of cell buffers.

B. Description of the Related Art

Many data networks pass data in the form of cells. The cells, which are of fixed size, pass through one or more switches on the way to a specified destination, which may be another switch, a terminal, or some other component in the network. An individual cell may need to be sent to several different destinations in the network from a single switch.

During a data cell read or write operation, the cell memory must be accessed multiple times. Typically, the memory must function at a rate that is a multiple of the cell arrival rate. For high speed data switches, this requires a very high speed memory. This performance requirement for the memory greatly limits the types of memory that can successfully perform the read and write operations in common switches of very high capacities. Generally, only small, fast memories are capable of meeting these requirements. This limits the capacity and increases the cost of the switch or restricts the speed of the data cells. While custom memories may be fabricated to meet these requirements, the cost of these are high. Therefore, it is desirable to provide a method and system for storing data cells capable of operating at high speeds, while using low cost memories.

SUMMARY OF THE INVENTION

This invention satisfies this and other desires by providing a low-cost, high speed switch that stores data cells.

A data cell storage system consistent with the present invention comprises a plurality of memory units for storing data cells. An output means outputs a memory address and a memory selecting unit selects one of the plurality of memory units based on the outputted memory address. A further means then performs a read or write operation at the outputted memory address of the selected memory unit.

In another aspect, the invention includes a method for storing data cells. The method includes the step of outputting a memory address and then selecting one of a plurality of memory units based on the outputted memory address. A read or write operation is then performed at the outputted memory address of the selected memory unit.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DETAILED DESCRIPTION

A. Overview

Reference will now be made in detail to embodiments consistent with this invention and illustrated in the accompanying drawings. The same reference numbers in different drawings generally refer to the same or like parts.

Systems and methods consistent with the invention enable a high speed switch that can store data cells using a low cost memory. Generally, the switch includes a bank of cell buffer memories coupled to a control means for controlling the reading and writing of data cells from and to the cell buffer memories. The control means enables data cells to be written to one cell buffer memory of the memory bank while at the same time reading data cells from another cell buffer memory of the memory bank. To this end, the control means selects one of the cell buffer memories of the memory bank for execution of a particular read or write operation.

B. Switch Organization

Figure 1:
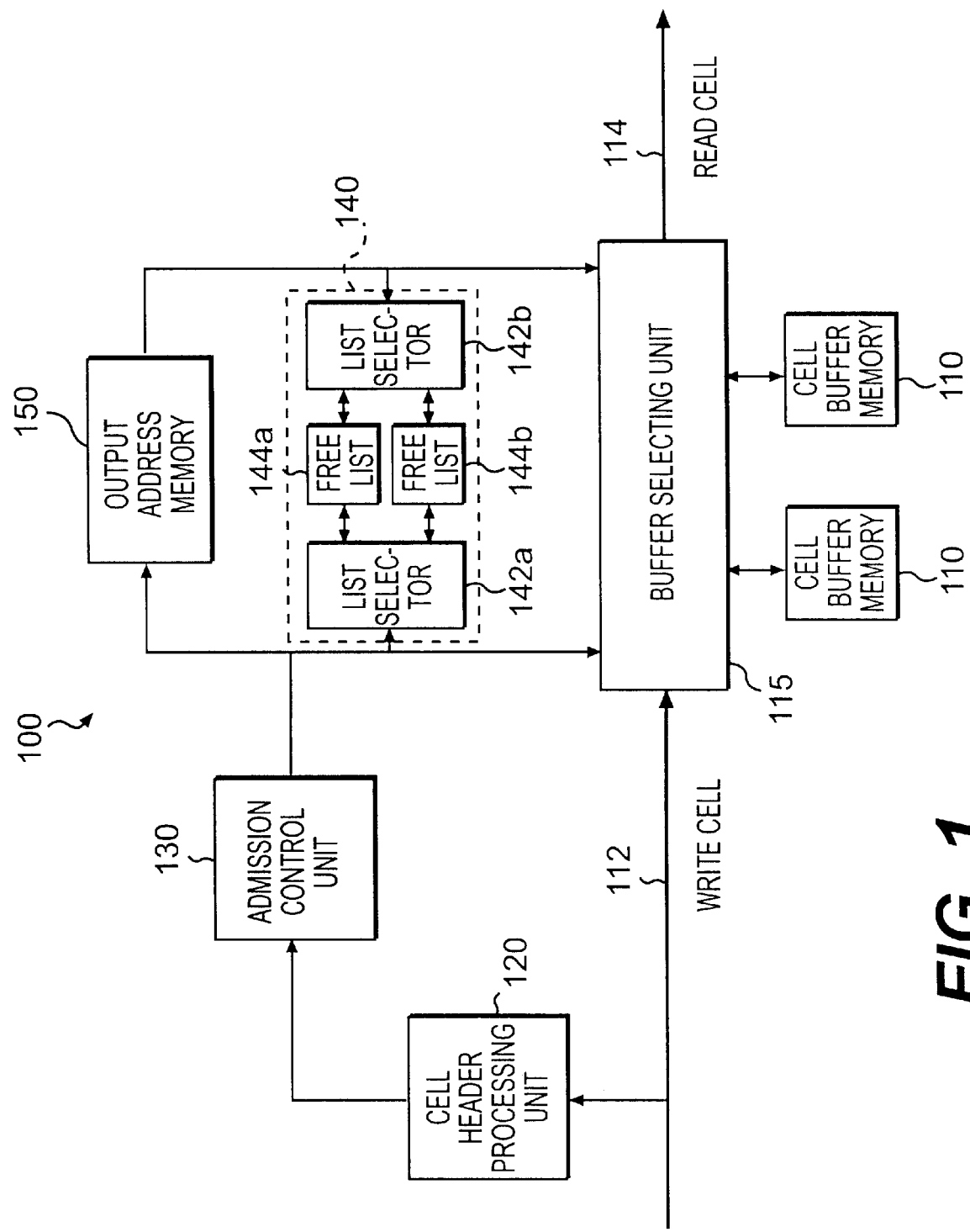
FIG. 1 is a block diagram of a switch 100 consistent with the present invention.

FIG. 1 is a block diagram of a switch 100 consistent with the present invention. As shown in FIG. 1, switch 100 includes a bank of cell buffer memories 110, a buffer selecting unit 115, a cell header processing unit 120, an admission control unit 130, a free list memory 140, and an output address memory 150. Switch 100 stores data cells received over an input bus 112 and outputs data cells over an output bus 114. Busses 112 and 114 generally transfer data cells at a variety of switching rates. In one application, busses 112 and 114 transfer cells at a rate of 208 MHz for 80 Gbps, with each data cell having a bit length of 512 bits.

Cell buffer memories 110 store data cells received over input bus 112. Switch 100 preferably includes a bank of two cell buffer memories 110 so that data cells can be written to one cell buffer memory at the same time data cells are read from the other cell buffer memory. The use of two cell buffer memories 110 allow switches 100 consistent with the present invention to operate at faster rates while using slower, off-the-shelf memory devices. Cell buffer memories 110 may be any low cost memory, such as single-port synchronous random access memories (SRAMs) or dynamic random access memories (DRAMs).

Buffer selecting unit 115 selects one of cell buffer memories 110 to perform either a read or write operation. Specifically, buffer selecting unit 115 selects one of cell buffer memories 110 for a write operation and selects, at the same time, the other cell buffer memory 110 for a read operation. In this way, the speed of switch 100 may be increased by writing to one cell buffer memory 110 while at the same time reading from another, as described above. Buffer selecting unit 115 may preferably be a digital multiplexer/demultiplexer device and operates at the data rates of busses 112 and 114.

Cell header processing unit 120 and admission control unit 130 process a header field of each incoming data cell to determine whether switch 100 can store that data cell in one of cell buffer memories 110, as known to those skilled in the art. Each header field contains a destination port for its appended data cell. Cell header processing unit 120 extracts the header field from the incoming data cell and determines the destination port from the header field. As known to those skilled in the art, admission control unit 130 then determines whether switch 100 should store the incoming data cell in cell buffer memory 110. Admission control unit 130 makes this determination based on, for example, whether the ports are fall, whether cell buffer memories 110 are full, and the priority of the incoming data cell.

Free list memory 140 further includes free list selectors 142a and 142b and free lists 144a and 144b. Each free list 144 stores addresses of a corresponding cell buffer memory 110 at which switch 100 may write an incoming data cell into the corresponding cell buffer memory 110. Thus, the number of free lists 144 generally corresponds to the number of cell buffer memories 110 included in switch 100. List selectors 142 select a free list 144 based on a read address generated by output address memory 150. Because the read address corresponds to only one of the free lists 144, free list selector 142b will select that free list 144 corresponding to the outputted read address. Free list selector 142a will then select the other free list 144 to obtain a write address for a concurrent write operation.

Free list memory 140 outputs the write address to buffer selecting unit 115. Because the write address corresponds to only one of cell buffer memories 110, buffer selecting unit 115 will select the cell buffer memory 110 corresponding to that write address. Free lists 144 of free list memory 150 may be implemented as single-port first-in-first-out (FIFO) memories, such that the address of cell buffer memories 110 that has been available the longest is used first during a write operation.

Output address memory 150 stores the addresses at which cell buffer memory 110 stores a data cell. Free list memory 140 outputs these addresses to output address memory 150 during each write operation. Similarly, output address memory 150 outputs to free list memory 140 the addresses used during a read operation. Output address memory 150 is preferably a FIFO memory so that the address received from free list memory 150 that has been stored the longest is read first.

C. Writing and Reading Data Cells

Figure 2:
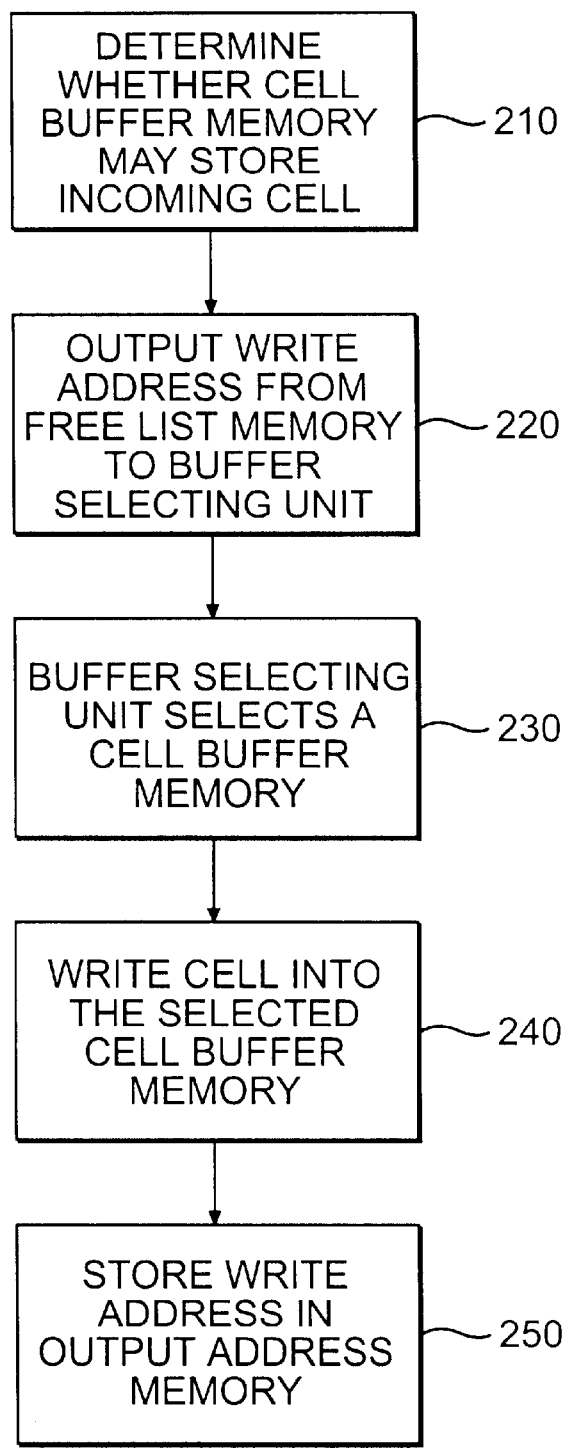
FIG. 2 is a flow diagram of a method consistent with the present invention for writing cells to switch 100.

FIG. 2 is a flow diagram of a method consistent with the present invention for writing data cells to switch 100. FIG. 2 shows that admission control unit 130 first determines whether cell buffer memories 110 may store an incoming data cell (step 210). Using methods known to those skilled in the art, admission control unit 130 preferably determines whether to store the incoming data cell based on the memory space available in cell buffer memories 110, the availability of the output ports of cell buffer memories, and the priority of the incoming data cell. When free list memory 140 receives a control signal from admission control unit 130 indicating that switch 100 may store the incoming cell, free list memory 140 outputs a write address to buffer selecting unit 115 (step 220).

Upon receipt of the control signal, free list memory 140 outputs a write address from the free list 144 not selected by the read address of a concurrent read operation, described below in reference to FIG. 3. Further, because free lists 144 of free list memory 140 are FIFO memories, free list memory 140 outputs the write address of cell buffer memories 110 that has been available the longest. Buffer selecting unit 115 receives the write address from free list memory 140 and selects the cell buffer unit 110 that corresponds to the write address (step 230). To this end, the addresses of cell buffer memories 110 are preferably distinguishable from each other such that buffer selecting unit 115 can select a cell buffer 110 based upon a particular address. Buffer selecting unit 115 then writes the incoming data cell received over input bus 112 in the selected cell buffer memory 110 at the write address (step 240).

In addition to outputting the write address to buffer selecting unit 115, free list memory 140 also outputs the write address to output address memory 150 (step 250). Output address memory 150 stores each write address to keep a record of the addresses at which data cells are stored in cell buffer memories 110. These addresses are then used to read a particular data cell from cell buffer memories 110, as described below with respect to FIG. 3. Switch 100 preferably writes data cells using a burst format known to those skilled in the art.

Figure 3:
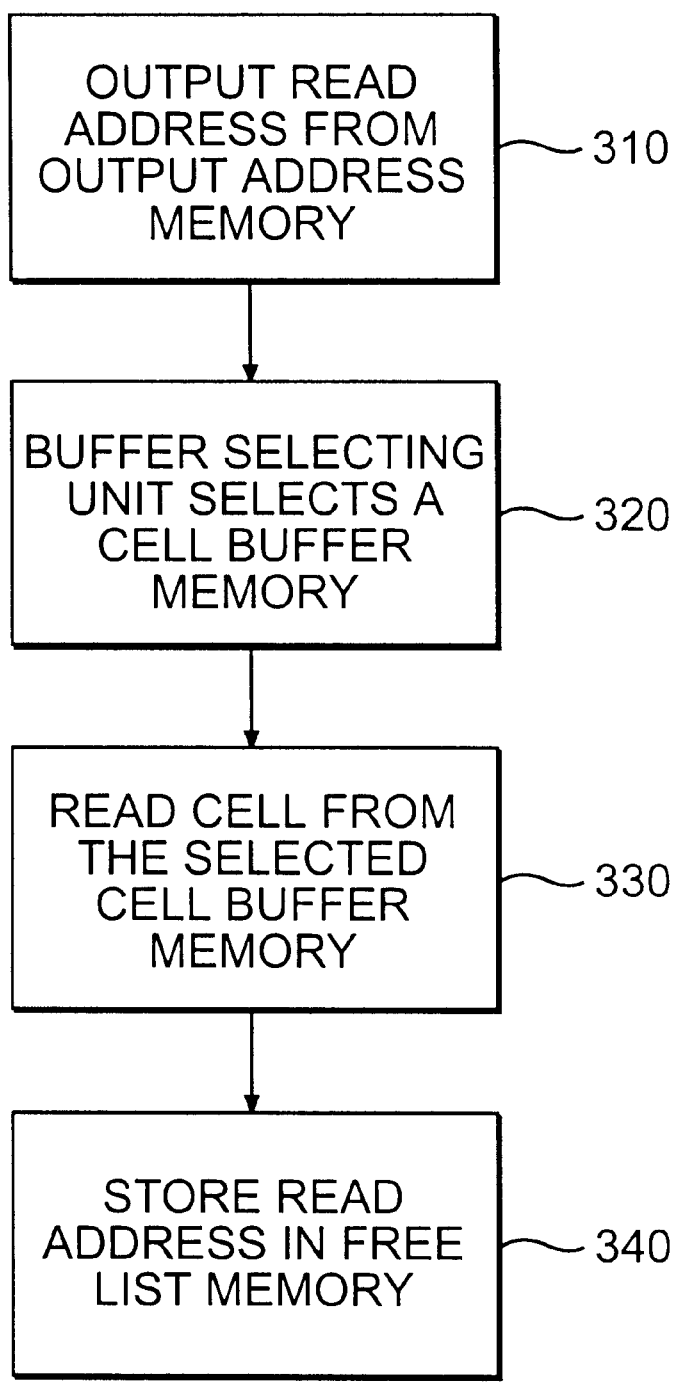
FIG. 3 is a flow diagram of a method consistent with the present invention for reading cells from memory 100.

FIG. 3 is a flow diagram of a method consistent with the present invention for reading cells from switch 100. FIG. 3 shows that output address memory 150 first outputs a read address to buffer selecting unit 115 (step 310). Output address memory outputs the read address upon receipt of an instruction from a system controller (not shown) to read a particular data cell. Buffer selecting unit 115 then selects the cell buffer memory 110 corresponding to the read address (step 320), and then reads the data cell from the selected cell buffer memory 110 (step 330). Like the write operation, switch 100 preferably reads data cells using a burst format known to those skilled in the art.

In addition to outputting the read address to buffer selecting unit 115, output address memory 150 also outputs the read address to free list memory 140 for storage therein (step 340). Free list memory 140 stores each read address to keep a record of which memory addresses are available for a subsequent write operation. These addresses are then used to write a particular data cell to cell buffer memories 110, as described above with respect to FIG. 2.

D. Conclusion

Systems and methods consistent with the present invention provide a low-cost, high-speed switch that stores data cells in a bank of cell buffer memories. It will be apparent to those skilled in the art that various modifications and variations can be made to the system and method of the present invention without departing from the spirit or scope of the invention. The present invention covers the modifications and variations of this invention provided they come within the scope of the appended claims and their equivalents.

What is claimed is:

1. A data cell storage system comprising:

a plurality of memory units for storing data cells, wherein each memory unit has a corresponding set of memory addresses;

means for outputting a memory address of one of the plurality of memory units;

a memory selecting unit for selecting one of the plurality of memory units based on the outputted memory address and the corresponding sets of memory addresses of the plurality of memory units; and means for performing a read or write operation at the memory address of the selected memory unit, wherein the outputting means further includes a free list memory for storing write addresses of the plurality of memory units at which the read or write operation performing means may write a data cell into one of the plurality of memory units, and wherein the memory address corresponds to a write address stored in the free list memory, and wherein the outputting means outputs a control signal to indicate whether the system can store an input data cell, and wherein the free list memory further includes:

a first free list memory unit for storing write addresses of a first memory unit of the plurality of memory units at which the read or write operation performing means may write a data cell into the first memory unit;

a second free list memory unit for storing write addresses of a second memory unit of the plurality of memory units at which the read or write operation performing means may write a data cell into the second memory unit; and a free list memory selecting unit for selecting one of the free list memory units based on the control signal.

2. The system of claim 1, wherein the plurality of memory units further include:

a plurality of single port synchronous random access memories.

3. The system of claim 1, wherein the free list memory further includes:

a first-in-first-out memory unit for storing the write addresses of the plurality of memory units.

4. The system of claim 1, wherein the outputting means further includes:

an output address memory for storing read addresses of the plurality of memory units at which the read or write operation performing means may read a data cell from one of the plurality of memory units, and wherein the outputted memory address is stored as a read address in the output address memory.

5. The system of claim 4, wherein the outputting means further includes:

means for storing a read address from the output address memory in the free list memory.

6. The system of claim 4, wherein the outputting means further includes:

means for storing a write address from the free list memory in the output address memory.

7. The system of claim 4, wherein the output address memory further includes:

a first-in-first-out memory unit for storing the read addresses of the plurality of memory units.

8. The system of claim 1, wherein the outputting means further includes:

first means for determining a destination of an input data cell;

second means for determining whether the system can store an input data cell based upon the determined destination; and means for outputting the memory address when the second means for determining determines that the system can store the input data cell.

9. The system of claim 1, wherein the memory address is a write address for a write operation and wherein the outputting means further includes:

means for selecting the write address based on a read address for a read operation performed concurrent with the write operation; and means for outputting the write address.

10. The system of claim 1, wherein the memory selecting unit further includes:

a multiplexer/demultiplexer for selecting one of the plurality of memory units based on the memory address.

11. The system of claim 1, wherein the read or write operation performing means includes:

means for writing a first data cell to the first memory unit of the plurality of memory units; and means for reading a second data cell from the second memory unit of the plurality of memory units, wherein the means for writing writes the first data cell into the first memory unit during a time when the means for reading reads the second data cell from the second memory unit.

12. The system of claim 1, wherein the selecting means further includes:

means for comparing the outputted memory address with the corresponding sets of memory addresses of the plurality of memory units, and for selecting the memory unit having a memory address corresponding to the outputted memory address.

13. A method for storing data cells, comprising:

outputting a memory address of one of a plurality of memory unit, wherein each memory unit has a corresponding set of memory addresses;

selecting one of the plurality of memory units based on the outputted memory address and the corresponding sets of memory addresses of the plurality of memory units; and performing a read or write operation at the memory address of the selected memory unit, wherein the outputting step further includes the substeps of:

storing, in a free list memory, write addresses of the plurality of memory units at which a data cell may be written into one of the plurality of memory units, and wherein the outputted memory address corresponds to a write address stored in the free list memory, outputting a control signal to indicate whether an input data cell can be stored in one of the plurality of memory units;

storing write addresses of a first memory unit of the plurality of memory units at which a data cell may be written into the first memory unit;

storing write addresses of a second memory unit of the plurality of memory units at which a data cell may be written into the second memory unit; and selecting units the free list memory based on the control signal.

14. The method of claim 13, wherein the step of selecting one of the plurality of memory units further includes the substep of:

selecting one of a plurality of single port synchronous random access memories.

15. The method of claim 13, wherein the step of storing in a free list memory further includes the substep of:

storing write addresses in a first-in-first-out memory unit.

16. The method of claim 13, wherein the outputting step further includes the substep of:

storing, in an output address memory, read addresses of the plurality of memory units at which a data cell may be read from one of the plurality of memory units, and wherein the outputted memory address is stored as a read address in the output address memory.

17. The method of claim 16, wherein the outputting step further includes the substep of:

storing a read address from the output address memory in the free list memory.

18. The method of claim 16, wherein the outputting step further includes the substep of:

storing a write address from the free list memory in the output address memory.

19. The method of claim 16, wherein the step of storing in an output address memory further includes the substep of:

storing read addresses in a first-in-first-out memory unit.

20. The method of claim 13, wherein the outputting step further includes the substeps of:

determining a destination of an input data cell;

determining whether to store an input data cell based upon the determined destination; and outputting the memory address when the substep for determining whether the system can store an input data cell determines that the input data cell can be stored.

21. The method of claim 13, wherein the memory address is a write address for a write operation and wherein the outputting step further includes the substeps of:
   selecting the write address based on a read address for a read operation performed concurrent with the write operation; and
   outputting the write address.

22. The method of claim 13, wherein the step of performing a read or write operation includes the substeps of:
   writing a first data cell to the first memory unit of the plurality of memory units; and
   reading a second data cell from the second memory unit of the plurality of memory units,
   wherein the writing substep and the reading substep are performed simultaneously.

23. The method of claim 13, wherein the selecting step further includes the substeps of:
   comparing the outputted memory address with the corresponding sets of memory addresses of the plurality of memory units; and
   selecting the memory unit having a memory address corresponding to the outputted memory address.

24. A communications network comprising:
   a plurality of nodes sending and receiving data cells; and
   a switch interconnecting the nodes, the switch including
      a plurality of memory units for storing the data cells, wherein each memory unit has a corresponding set of memory addresses;
      means for outputting a memory address of one of the plurality of memory units;
      a memory selecting unit for selecting one of the plurality of memory units based on the outputted memory address and the corresponding sets of memory addresses of the plurality of memory units; and
      means for performing a read or write operation at the memory address of the selected memory unit,
      wherein the outputting means further includes a free list memory for storing write addresses of the plurality of memory units at which the read or write operation performing means may write a data cell into one of the plurality of memory units, and wherein the memory address corresponds to a write address stored in the free list memory,
      wherein the outputting means outputs a control signal to indicate whether the switch can store an input data cell, and wherein the free list memory further includes:
         a first free list memory unit for storing write addresses of a first memory unit of the plurality of memory units at which the read or write operation performing means may write a data cell into the first memory unit;
         a second free list memory unit for storing write addresses of a second memory unit of the plurality of memory units at which the read or write operation performing means may write a data cell into the second memory unit; and
         a free list memory selecting unit for selecting one of the free list memory units based on the control signal.

25. The network of claim 24, wherein the plurality of memory units further include:
   a plurality of single port synchronous random access memories.

26. The network of claim 24, wherein the free list memory further includes:
   a first-in-first-out memory unit for storing the write addresses of the plurality of memory units.

27. The network of claim 24, wherein the outputting means further includes:
   an output address memory for storing read addresses of the plurality of memory units at which the read or write operation performing means may read a data cell from one of the plurality of memory units, and wherein the outputted memory address is stored as a read address in the output address memory.

28. The network of claim 27, wherein the outputting means further includes:
   means for storing a read address from the output address memory in the free list memory.

29. The network of claim 27, wherein the outputting means further includes:
   means for storing a write address from the free list memory in the output address memory.

30. The network of claim 27, wherein the output address memory further includes:
   a first-in-first-out memory unit for storing the read addresses of the plurality of memory units.

31. The network of claim 24, wherein the outputting means further includes:
   first means for determining a destination of an input data cell;
   second means for determining whether the switch can store an input data cell based upon the determined destination; and
   means for outputting the memory address when the second means for determining determines that the switch can store the input data cell.

32. The network of claim 24, wherein the memory address is a write address for a write operation and wherein the outputting means further includes:
   means for selecting the write address based on a read address for a read operation performed concurrent with the write operation; and
   means for outputting the write address.

33. The network of claim 24, wherein the memory selecting unit further includes:
   a multiplexer/demultiplexer for selecting one of the plurality of memory units based on the memory address.

34. The network of claim 24, wherein the read or write operation performing means includes:
   means for writing a first data cell to the first memory unit of the plurality of memory units; and
   means for reading a second data cell from the second memory unit of the plurality of memory units,
   wherein the means for writing writes the first data cell into the first memory unit during a time when the means for reading reads the second data cell from the second memory unit.

35. The network of claim 24, wherein the selecting means further includes:
   means for comparing the outputted memory address with the corresponding sets of memory addresses of the plurality of memory units, and for selecting the memory unit having a memory address corresponding to the outputted memory address.

* * * * *

UNITED STATES PATENT AND TRADEMARK OFFICE
CERTIFICATE OF CORRECTION

PATENT NO. : 6,314,489 B1  Page 1 of 1
DATED : November 6, 2001
INVENTOR(S) : Stacy W. Nichols et al.

It is certified that error appears in the above-identified patent and that said Letters Patent is hereby corrected as shown below:

<u>Column 6, claim 13,</u>
Line 6, change "unit" to -- units --;
Line 31, after "selecting" delete "units".

<u>Column 6, claim 20,</u>
Line 66, change "the system can" to -- to --.

Signed and Sealed this

Second Day of April, 2002

Attest:

JAMES E. ROGAN
*Attesting Officer*    *Director of the United States Patent and Trademark Office*